No. 725,086. PATENTED APR. 14, 1903.
M. JACOBS.
DEODORIZING OR DISINFECTING APPARATUS.
APPLICATION FILED AUG. 4, 1902.
NO MODEL.
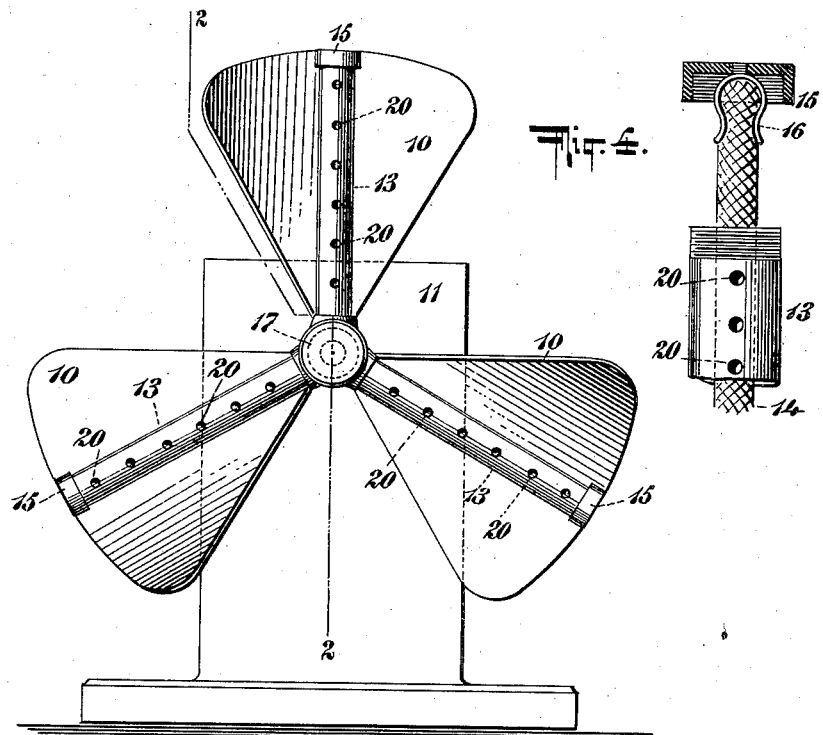
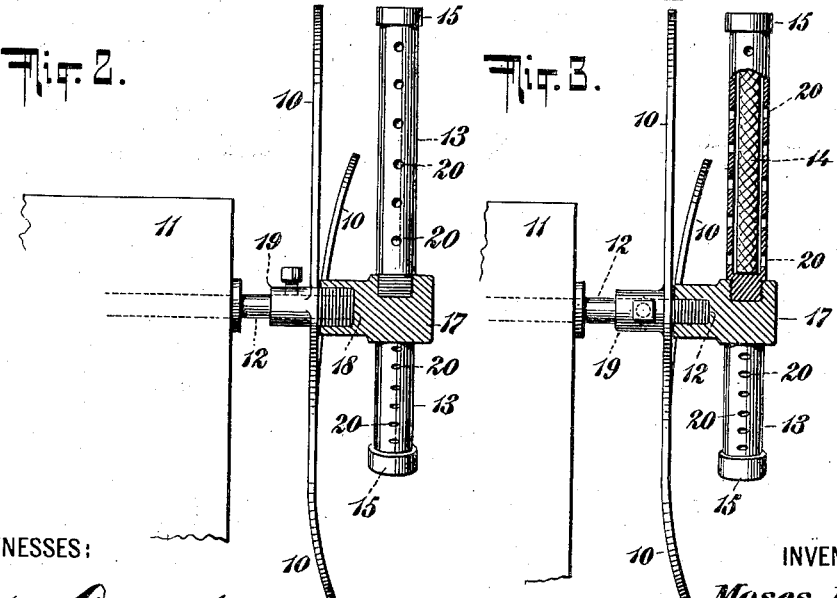
WITNESSES:
Gustave Dieterich.
Edwin H. Dieterich.
INVENTOR
Moses Jacobs
BY
Chas. C. Gill
ATTORNEY

UNITED STATES PATENT OFFICE.

MOSES JACOBS, OF NEW YORK, N. Y.

DEODORIZING OR DISINFECTING APPARATUS.

SPECIFICATION forming part of Letters Patent No. 725,086, dated April 14, 1903.

Application filed August 4, 1902. Serial No. 118,204. (No model.)

*To all whom it may concern:*

Be it known that I, MOSES JACOBS, a citizen of the United States, and a resident of New York, in the county of New York and State of New York, have invented certain new and useful Improvements in Deodorizing or Disinfecting Apparatus, of which the following is a specification.

The invention relates to improvements in deodorizing and disinfecting apparatus; and it consists in the novel features, arrangement, and combinations of parts hereinafter described, and particularly pointed out in the claims.

In its preferred form the deodorizing apparatus of my invention will comprise an electric fan of usual character and a series of perforated tubes secured in front thereof and to rotate therewith, said tubes containing deodorizing or disinfecting material held by suitable wicks or fibrous material, the object being that the blades of the fan during their rotation shall drive the odors emanating from said tubes throughout a room or apartment requiring to be deodorized or disinfected. By preference the tubes will be perforated on their sides, so that as said tubes are rotated said perforations will be driven against the air and the air will enter or move against said perforations, and thereby the more assuredly will the substance within the tubes be compelled to give off its odor and said odor be distributed throughout a room.

The invention will be fully understood from the detailed description hereinafter presented, reference being had to the accompanying drawings, in which—

Figure 1 is a front elevation of a deodorizing apparatus constructed in accordance with and embodying the invention. Fig. 2 is a sectional view of same on the dotted line 2 2 of Fig. 1. Fig. 3 is a like sectional view of same, but illustrating one of the tubes as being partly in section and also presenting a slight modification of the apparatus; and Fig. 4 is an enlarged view of a portion of one of the perforated tubes and illustrating a portion of the wick as being inserted therein, said wick being held at its outer end by a closing-cap for said tube, said cap being in section.

In the drawings, 10 designates the blades of the fan; 11, diagrammatically, the motor for driving said fan; 12, the shaft driven by the motor and upon which the said fan is mounted, and 13 the perforated tubes containing the wicks 14 and adapted to be closed at their outer ends by the caps 15, the latter being provided with spring-clips 16 to engage and hold the outer ends of the wicks 14. The blades 10, motor 11, and shaft 12 require no special description, because they are of well-known character and are utilized by me simply as a convenient means for carrying my invention into effect.

The perforated tubes 13 will preferably correspond in number with the number of blades 10 constituting the fan, and said tubes will be arranged in line with the blades of the fan, as shown, and radiate from a hub 17, which will be secured to rotate with the fan in any convenient way. In Fig. 2 I illustrate the hub 17 as being threaded and as engaging a threaded hub 18, extending outwardly from the center of the fan, and in Fig. 3 I illustrate the hub 17 as being threaded and as engaging the outer threaded end of the shaft 12, the shaft 12 in the construction presented in Fig. 3 extending entirely through the hub 19 of the fan and projecting beyond the same to a sufficient extent to properly receive the said hub 17. The tubes 13 contain a number of perforations 20 and will preferably be perforated not only on their front and rear faces, as shown in Figs. 1 and 3, but also on their sides, as shown in Fig. 2, so that during the rotation of said tubes the said side perforations may be carried against the air for enabling the latter by its direct force and by the suction created around the said side apertures, due to the movement of the tubes through the air, to assuredly and to a maximum degree effect the emanation and distribution of the odors from the material held by the wicks 14 within said tubes. The tubes 13 will preferably be screwed into threaded sockets formed in the hub 17, and at their outer ends said tubes will be closed by means of the threaded caps 15, the latter engaging the threaded ends of said tubes. The caps 15 will be provided with clips 16 for engaging and holding the ends of the wicks 14, and the latter will be sufficient in extent to just about fill the interior of the tubes 13, as shown in Fig. 3. The wicks 14 are employed to carry the deodorizing or disinfecting material, which ordinarily will be a solution into which the wicks 14 will be dipped, so as to carry a certain amount thereof. After the dipping of the wicks 14 into the deodorizing or disinfecting solution the said wicks, then being held by the caps 15, will be inserted into the tubes 13 and there secured by the application of said caps upon the ends of said tubes. The wicks 14 having been impregnated with the deodorizing or disinfecting material and secured within the tubes 13, the apparatus will be in condition for immediate use. When the motor 11 is set into action, the fan-blades 10 and tubes 13 will be rotated from the shaft 12, and the odors arising from the material within the tubes 13 will, by the centrifugal action of said tubes and by the action of the blades 10, be distributed throughout the compartment within which the apparatus may be placed. It is not my purpose to so saturate the wicks 14 that the deodorizing or disinfecting material itself shall escape through the perforations of the tubes 13, but that simply the odors given off by said material shall escape through said perforations and be driven through the atmosphere of the room by means of the fan-blades 10. When the tubes 13 are carried to rotate with the blades 10, they in themselves will compel a certain emanation and distribution of the odors from the deodorizing or disinfecting material; but with the combination of the said rotary tubes with the fan-blades the said odors may with the maximum efficiency and degree be rapidly distributed. After the deodorizing or disinfecting material carried by the wicks 14 has become consumed the said wicks may, by unscrewing the caps 15, be withdrawn from the tubes 13 and redipped or resupplied with deodorizing or disinfecting material. I prefer to use as many of the tubes 13 as there are blades 10 in the fan, but do not limit the invention to any special number of the tubes 13. The tubes 13 are independent of each other, and hence one character of deodorizing material may be carried by the wick within one of said tubes and a different character of deodorizing material carried by the wick in one of the other or all of the other tubes, and this is a desirable feature of the invention, because under certain conditions it is desirable that two different deodorizing materials be employed and that their odors may be commingled and distributed throughout a room.

The hub 17 for the tubes 13 is shown as secured by screw-threads, and it will be obvious that these threads should run in a reverse direction to that of the motion taken by the tubes during their rotation, so that said hub will not be unscrewed from its support. The applying of the hub 17 to the fan or fan-shaft by screw-threads enables the ready detachment of the tubes 13 when it is desired to employ the fan without the tubes and also when it may be desired for any other reason to detach said tubes.

What I claim as my invention, and desire to secure by Letters Patent, is—

1. In an apparatus of the character described, the fan, and the tubes mounted in proximity to said fan and to rotate therewith, said tubes having numerous free perforations along their sides, combined with the fibrous filling 14 for said tubes adapted to hold a deodorizing substance, and the removable caps for the outer ends of said tubes; substantially as set forth.

2. In an apparatus of the character described, the fan, and the tubes mounted in proximity to said fan and to rotate therewith, said tubes having numerous free perforations along their sides, combined with the fibrous filling 14 for said tubes adapted to hold a deodorizing substance, and the removable caps for the outer ends of said tubes, said caps having clips 16 for engaging the outer end of said filling; substantially as set forth.

3. In an apparatus of the character described, the fan, and the perforated tube mounted in proximity to said fan and to rotate therewith, said tube being perforated on that side thereof moving against the air during the rotation of said fan and tube, and containing a substance holding a deodorizing material; substantially as set forth.

Signed at New York, in the county of New York and State of New York, this 1st day of August, A. D. 1902.

MOSES JACOBS.

Witnesses:
CHAS. C. GILL,
ARTHUR MARION.